US005651103A

United States Patent [19]

Arsenault et al.

[11] Patent Number: 5,651,103

[45] Date of Patent: Jul. 22, 1997

[54] MAIL HANDLING APPARATUS AND PROCESS FOR PRINTING AN IMAGE COLUMN-BY-COLUMN IN REAL TIME

[75] Inventors: Robert G. Arsenault, Stratford; Steven J. Pauly, New Milford; Sungwon Moh, Wilton; David N. Long, Cheshire, all of Conn.

[73] Assignee: Pitney Bowes Inc., Stamford, Conn.

[21] Appl. No.: 554,179

[22] Filed: Nov. 6, 1995

[51] Int. Cl.[6] .................................................. G06K 15/00

[52] U.S. Cl. .......................................... 395/117; 395/115

[58] Field of Search .................................. 395/117, 101, 395/112, 114, 115–116, 106, 135, 836, 502, 503, 504; 364/464.01, 464.02, 464.03, 464.04; 358/540, 404, 444

[56] References Cited

U.S. PATENT DOCUMENTS

| | | | |
|---|---|---|---|
| 4,313,684 | 2/1982 | Tazaki et al. . | |
| 5,140,675 | 8/1992 | Okada | 395/114 |
| 5,150,454 | 9/1992 | Wood et al. | 395/114 |
| 5,157,761 | 10/1992 | Hawkes | 395/107 |
| 5,163,125 | 11/1992 | Okada | 395/115 |
| 5,199,101 | 3/1993 | Cusick et al. | 395/115 |
| 5,210,822 | 5/1993 | Tsuchiya et al. | 395/115 |
| 5,237,646 | 8/1993 | Bunce | 395/117 |
| 5,526,271 | 6/1996 | Abumehdi | 364/464.02 |

FOREIGN PATENT DOCUMENTS

| | | | |
|---|---|---|---|
| 0578042A2 | 6/1993 | European Pat. Off. | G07B 17/00 |

*Primary Examiner*—Arthur G. Evans

*Attorney, Agent, or Firm*—Steven J. Shapiro; Melvin J. Scolnick

[57] ABSTRACT

An apparatus for producing an image in a mail handling machine includes a printing device and a non-volatile memory having fixed and variable image data elements stored therein, a first portion of the fixed image data elements being stored in a compressed manner and a second portion of the fixed image data elements being stored in a bit map form. The apparatus further includes a first control device for identifying at least one of the variable image data elements stored in the non-volatile memory and associated with the image and a second control device for receiving from the first control device data corresponding to the at least one of the variable image data elements associated with the image and for downloading from the non-volatile memory and combining fixed image data elements associated with the image with the at least one of the variable data elements associated with the image and for utilizing the combined fixed and variable data elements associated with the image to cause the printing mechanism to print the image.

13 Claims, 2 Drawing Sheets

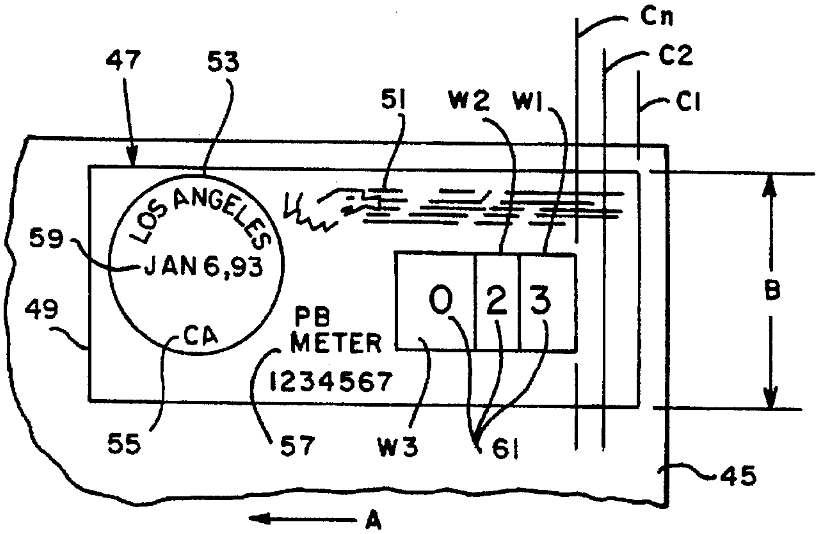
FIG. 2
bit B15 B14 B13 B12 B11 B10 B9 B8
0 (byte#) (pattern) (5_bit_data_length_field)
bit B7 B6 B5 B4 B3 B2 B1 B0
← 8_bit_data_length_field →
FIG. 3
bit B15 B14 B13 B12 B11 B10 B9 B8
1 (byte#) (6_bit_address_register_number)
or (6_bit immediate_data)
bit B7 B6 B5 B4 B3 B2 B1 B0
← 8_ bit_index_field →
FIG. 4
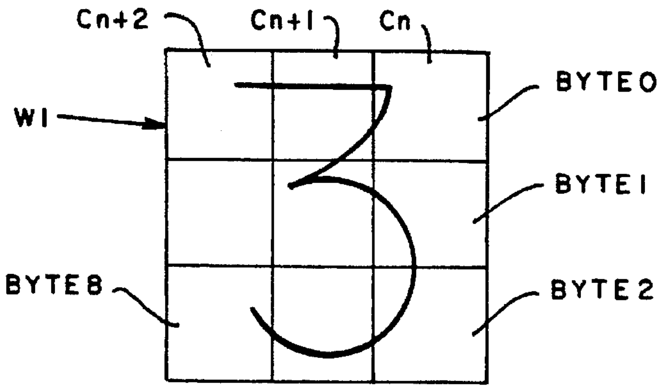
FIG. 5

MAIL HANDLING APPARATUS AND PROCESS FOR PRINTING AN IMAGE COLUMN-BY-COLUMN IN REAL TIME

BACKGROUND OF THE INVENTION

This invention relates to a process and an apparatus for generating images in real time, and more particularly to a process and apparatus for printing a postage indicia on a column-by-column basis in real time.

Traditional postage meters imprint an indicia on a mailpiece as evidence that postage has been paid. These traditional postage meters create the indicia using a platen or a rotary drum which are moved into contact with the mailpiece to imprint the indicia thereon. While traditional postage meters have performed admirably over time, they are limited by the fact that if the indicia image significantly changes, a new platen or rotary drum will have to be produced and placed in each meter. Accordingly, newer postage meters now take advantage of modern digital printing technology to overcome the deficiencies of traditional meters. The advantage of digital printing technology is that since the digital printhead is software driven, all that is required to change an indicia image is new software. Thus, the flexibility in changing indicia images or adding customized ad slogans is significantly increased.

Modern digital printing technology includes thermal ink jet (bubble jet), piezoelectric ink jet, thermal printing techniques, and LED and Laser Xerographic printing which all operate to produce images by dot-matrix printing. In dot-matrix ink jet printing individual print elements in the printhead (such as resistors or piezoelectric elements) are either electronically stimulated or not stimulated to expel or not expel, respectively, drops of ink from a reservoir onto a substrate. Thus, by controlling the timing of the energizing of each of the individual print elements in conjunction with the relative movement between the printhead and the mailpiece, a dot-matrix pattern is produced in the visual form of the desired indicia. However, in order to allow the printhead to produce the desired image, the entire image data are typically stored in an electronic non-volatile memory in a compressed manner, converted to binary data and downloaded and stored as a bit map in a temporary volatile memory, and then downloaded to the printhead driver. The indicia image contains both fixed and variable data. The fixed image data are the elements of the image that do not change. Examples of the fixed image data may include an indicia border, city and state of origin, meter number, zip code and other graphical information including advertising slogans. Variable image information is typically that image data which is changing on a per mailpiece basis such as the date, postage amount, or an encrypted value which is utilized to authenticate that a valid indicia has been printed. In order to print the full indicia, it is thus necessary to combine the fixed and variable data elements to create the required indicia for each individual transaction.

Postage meters utilizing digital printing technology typically combine the fixed and invariable image data into a complete bit map indicia image prior to printing. The image is conventionally combined by dedicating an electronic read-write memory (i.e. random access memory (RAM)) for use as temporary storage during the image element gathering stage. That is, while image data for the fixed and variable data are stored in a non-volatile memory (NVM), when an individual transaction takes place the postage meter microprocessor obtains the required variable and fixed data elements for that transaction from the non-volatile memory and combines and downloads the required variable image data with the fixed image data into the electronic read-write memory as a bit map of the actual entire indicia to be printed, thereby using the RAM as a temporary storage of the bit map image. The microprocessor then downloads the bit map image to the printhead for printing. However, since the variable image data changes from mailpiece to mailpiece, the microprocessor must edit the bit map image for every indicia printed. Editing an indicia bit map image significantly affects the performance and cost of the postage meter since it 1) takes time to do thereby reducing throughput, 2) requires a large amount of RAM, 3) demands the use of a high speed microprocessor and 4) requires a large amount of additional code and associated memory to perform the editing function.

European Patent Application 0 578 042 attempts to solve some of the problems addressed above by combining the fixed and variable image data during the printing of individual columns of the image. However, the apparatus of the aforementioned European Application still utilizes a RAM as a temporary memory for building a bit map image of the entire fixed image for each transaction prior to printing. Since the amount of fixed image data is typically much greater than the variable image data, a great deal of editing on a mailpiece by mailpiece basis is still required by the microprocessor and the need for a large amount of RAM and a high speed microprocessor still exists.

What is needed is a postage meter having a bit map image generator which builds an entire indicia image on a column-by-column basis in real time as printing occurs thereby 1) eliminating the need for editing and the temporary storage of the image in RAM, 2) freeing the microprocessor to perform other functions, and 3) increasing the throughput capability of the postage meter. Moreover, by eliminating the need for the RAM and fleeing the microprocessor to perform other functions, a high speed microprocessor is not required resulting in a reduced cost associated with implementing digital printing technology in a postage meter.

SUMMARY OF THE INVENTION

It is an object of the invention to provide a method for producing an image which can be utilized in a mail handling apparatus to print an indicia on a column by column basis in real time.

It is yet another object of the invention to provide a method for producing an image in a postage meter which precludes the need for storing more than a column of the image in a volatile memory prior to printing thereby increasing postage meter throughput, reducing memory requirements, and decreasing postage meter cost.

The above objects are met by a method for producing an image in a mail handling machine having the following steps:

A) storing fixed and variable image data elements in a non-volatile memory;

B) selecting specific fixed and variable image data elements only for a single column of the image;

C) downloading and combining the selected specific fixed and variable image data elements directly from the non-volatile memory into a buffer;

D) utilizing the downloaded selected specific fixed and variable image data elements in the buffer for energizing a printing mechanism for printing the single column of the image; and E) repeating steps B) through D) for printing subsequent columns of the image until the image has been printed completely.

Yet another object of the invention is to provide an apparatus for performing the above method. This object is met by an apparatus for producing an image which includes a printing device and a non-volatile memory having fixed and variable image data elements stored therein, a first portion of the fixed image data elements being stored in a compressed manner and a second portion of the fixed image data elements being stored in a bit map form. The apparatus further includes a first control device for identifying at least one of the variable image data elements stored in the non-volatile memory and associated with the image and a second control device for receiving from the first control device data corresponding to the at least one of the variable image data elements associated with the image and for downloading from the non-volatile memory and combining fixed image data elements associated with the image with the at least one of the variable data elements associated with the image and for utilizing the combined fixed and variable data elements associated with the image to cause the printing mechanism to print the image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is representation of a postage indicia generated according to the invention;

FIG. 3 shows a MAKE BITS instruction;

FIG. 4 shows a GET BITS instruction; and

FIG. 5 is an enlarged view of a portion of FIG. 2.

DETAILED DESCRIPTION OF THE PREFERRED EMBODIMENTS

Figure 1:
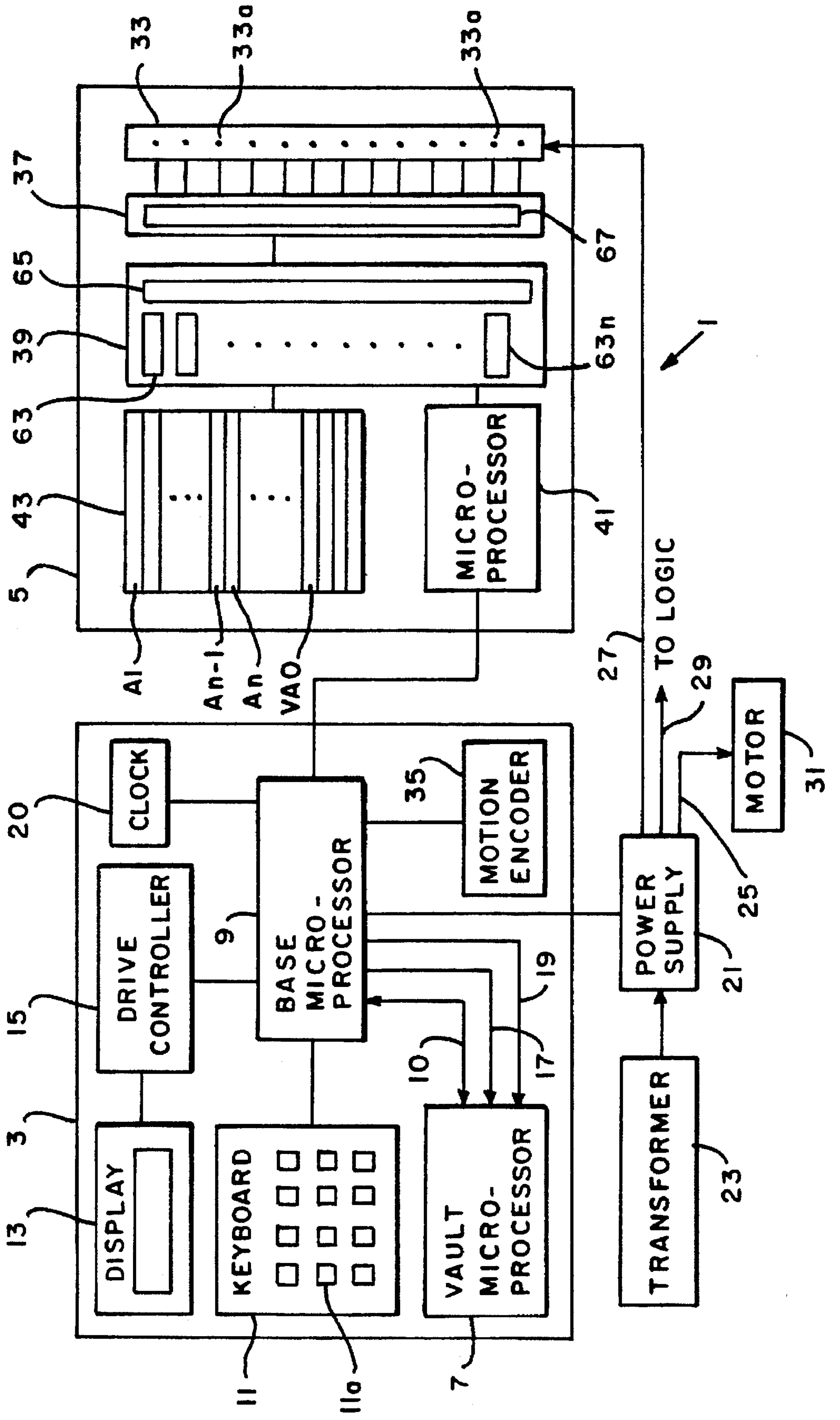
FIG. 1 is a schematic representation of a postage meter incorporating the invention.

FIG. 1 shows a schematic representation of a postage meter 1 implementing the inventive process. Postage meter 1 includes two primary modules, a base module 3 and a printhead module 5. Base module 3 includes a vault microprocessor 7 and a transaction microprocessor 9. Vault microprocessor 7 has software and associated memory to perform the accounting functions of postage meter 1. That is, vault microprocessor 7 has the capability to have downloaded therein in a conventional manner a predetermined amount of postage funds. During each postage transaction, vault microprocessor 7 checks to see if sufficient funds are available. If sufficient funds are available, vault microprocessor 7 debits the amount from a descending register, adds the amount to an ascending register, and sends the postage amount to the printhead module 5 via the transaction microprocessor 9. Transaction microprocessor 9 also sends the date data to the printhead module 5 so that a complete indicia image can be printed.

Vault microprocessor 7 thus manages the postage funds with the ascending register representing the lifetime amount of postage funds spent, the descending register representing the amount of funds currently available, and a control sum register showing the running total amount of funds which have been credited to the vault microprocessor 7. Additional features of vault microprocessor 7 which can be included are a piece counter register, encryption algorithms for encoding the information sent to the printhead module 5, and software for requiring a user to input a personal identification number which must be verified by the vault microprocessor 7 prior its authorizing a postage transaction.

Transaction microprocessor 9 acts as a traffic cop in coordinating and assisting in the transfer of information along data line 10 between the vault microprocessor 7 and the printhead module 5, as well as coordinating various support functions necessary to complete the metering function. Transaction microprocessor 9 interacts with keyboard 11 to transfer user information input through keyboard keys 11*a* (such as PIN number, postage amount) to the vault microprocessor 7. Additionally, transaction microprocessor 9 sends data to a liquid crystal display 13 via a driver/controller 15 for the purpose of displaying user inputs or for prompting the user for additional inputs. Moreover, base microprocessor 9 provides power and a reset signal to vault microprocessor 7 via respective lines 17, 19. A clock 20 provides date and time information to transaction microprocessor 9. Alternatively, clock 20 can be eliminated and the clock function can be accomplished by the base microprocessor 9.

Postage meter 1 also includes a conventional power supply 21 which conditions raw A.C. voltages from a wall mounted transformer 23 to provide the required regulated and unregulated D.C. voltages for the postage meter I. Voltages are output via lines 25, 27, and 29 to a printhead motor 31, printhead 33 and all logic circuits. Motor 31 is used to control the movement of the printhead relative to the mailpiece upon which an indicia is to be printed. Base microprocessor 9 controls the supply of power to motor 31 to ensure the proper starting and stopping of printhead 33 movement after vault microprocessor 7 authorizes a transaction.

Base module 3 also includes a motion encoder 35 that processes the movement of the printhead motor 31 so that the exact position of printhead 33 can be determined. Signals from motion encoder 35 are sent to printhead module 5 to coordinate the energizing of individual printhead elements 33*a* in printhead 33 with the positioning of printhead 33. Alternatively, motion encoder 35 can be eliminated and the pulses applied to stepper motor 31 can be counted to determine the location of printhead 33 and to coordinate energizing of printhead elements 33*a*.

Printhead module 5 includes printhead 33, a printhead driver 37, a drawing engine 39 (which can be a microprocessor or an Application Specific Integrated Circuit (ASIC)), a microprocessor 41 and a non-volatile memory 43. NVM 43 has stored therein image data of the fixed indicia and image data for each individual font that can be required as part of the variable data. Microprocessor 41 receives a print command, postage amount, and date via the transaction microprocessor 9. The postage amount and date are sent from microprocessor 41 to the drawing engine 39 which then accesses non-volatile memory 43 to obtain image data therefrom which is then downloaded by the drawing engine 39 to the printhead driver 37 in order to energize individual printhead elements 33*a* to produce a single column dot pattern of the indicia. The individual column-by-column generation of the indicia is synchronized with movement of printhead 33 until the full indicia is produced.

FIG. 2 shows a portion of a mailpiece 45 having an indicia image 47 imprinted thereon. The indicia image 47 includes a border 49, a graphical image 51, a city designation 53, a state designation 55, and a meter identification 57, all of which for the purposes of the preferred embodiment are considered to be the fixed portions of the indicia image 47. Also included as part of the indicia image 47 is the date 59 and the postage amount 61 which are the variable portions of the indicia image 47 which change on a mailpiece by mailpiece basis. Indicia 47 is simply a representative example of an indicia. One skilled in the art recognizes that various that various indicia images are possible which may include combinations of the elements set forth above or additional elements.

Digital printhead 33 typically includes a single column of individual elements 33*a* which each deposit an individual drop of ink onto the mailpiece when energized. Thus, as printhead 33 moves relative to mailpiece 45 in the direction of arrow "A", individual columns C1 . . . Cn of dots can be deposited on the mailpiece. In the simplest embodiment, the length of the column of print elements would match the dimension "B" of the indicia image 47 so that in a single pass of printhead 33 the full indicia image 47 can be created. It is readily apparent to those skilled in the art that in printing each individual column C1 . . . Cn, only certain print elements need to be energized. That is, for column C1, since this column represents a continuous border, every print element would be energized. However, in column C2, only those elements associated with producing that portion of the graphical information 51 and border 49 which intersect column C2 need to be energized. The entire indicia image 47 is therefore built on a column-by-column basis.

A description of the inventive process is set forth below with reference to FIGS. 1–5. Once a postage transaction in postage meter 1 has been authorized by vault microprocessor 7, a print command together with the variable data is sent to microprocessor 41. Microprocessor 41 translates the variable data received into address values of NVM 43 in which the selected alphanumeric fonts for the variable data are stored as bit map images. That is, for example, each of the numeric values in the postage amount of 0.23 of FIG. 2 is stored in the NVM 43 as a bit map image having a starting address. After microprocessor 41 determines the address in NVM 43 for each variable data element, it loads these addresses into variable address registers 63 . . . 63*n* of the drawing engine 39. Each variable address register 39 is associated with a particular data window within the indicia. That is, referring to the postage amount of FIG. 2, the data windows for numbers 3, 2, and 0 have been identified as w1, w2, and w3.

Subsequent to the above, when it is determined via encoder 35 that the position of the printhead 33 is approximately at column C1, drawing engine 39 fetches from a first address A1 of NVM 43 either a MAKE BITS or GET BITS instruction. The MAKE BITS instruction is to generate a bit pattern for "N" number of column bits for column C1. The bit pattern is specified in a data pattern field and the N specifies the data length field. With reference to FIG. 3, the MAKE BITS instruction is either a one-byte or two-byte instruction depending on the value (0 or 1) of bit B14. The data pattern field (bit B13) specifies the data to be repeated (either a 1 or a 0). The data length field (bit B12 through bit B0) specifies the bit pattern length ranging from 1 bit to 8192 bits, depending upon whether it is a one-byte instruction or a two-byte instruction. Bit B15 identifies the instruction as either a MAKE BIT instruction or a GET BIT instruction which is discussed in more detail below. Thus, the MAKE BIT instruction represents a compressed way of storing data such as the fixed data of column C1. For example, assuming that column C1 is 64 bits long and the printhead 33 has 64 elements 33*a*, it would be necessary to energize all of the 64 print elements 33*a* to produce the full border line of column C1. Therefore, where such a repetitive bit pattern is required (0 and 1 are used to represent energizing or not energizing individual printhead elements) instead of storing in memory a bit associated with each pixel (dot), the MAKE BITS instruction allows for the generation of the 64 bit data stream using only a two-byte instruction, thus saving a significant mount of required memory. The 64 bits are then sent serially to and stored in a column buffer 65 in the drawing engine 39 until the buffer 65 is filled with data corresponding to column C1. The 64 bits are then sent serially to a serial input/parallel output buffer 67 in printhead driver 37. Since buffer 67 has a one to one correlation with the number of print elements 33*a*, it can be strobed in synchronization with the printhead 33 position to energize all 64 elements at essentially the same time to produce the image of column C1. Of course, if column C1 had included portions that did not require printing, the bit stream would be changed to identify those elements which should not be energized. Moreover, while in the example given the printhead elements 33*a* directly correspond on a one for one basis with the number of bits in a column of the indicia 47, a printhead with less elements could be used to print portions of column C1 in multiple passes of the printhead. In this situation, the term "single column of the image" refers to each portion of the column C1 printed on each pass of printhead 33.

The GET BITS instruction is shown in FIG. 4 and is used to fetch and generate a length data pattern such as "M" number of bytes from NVM 43 (indirect data), or to generate an immediate bit pattern specified in the GET BITS instruction depending upon the data type identified in the instruction. The "M" specifies the height of the font in bytes. In FIG. 4, bit B15 identifies the instruction as a GET BIT instruction. Bit B14 identifies whether the instruction is an immediate bit pattern or an indirect data. If it is indirect, a bit pattern will be fetched from NVM 43. If it is immediate, the bit pattern is embedded in the instruction. If an indirect data type is indicated, the GET BITS instruction is two-bytes long, whereas it is one-byte long if the data type is immediate. Thus, for immediate data, only the byte of data represented by bits designated B8 to B15 are used, with bits B13 through B8 specifying a desired bit pattern of six bits. For indirect data, two bytes of data represented by bits designated B0 to B15 are used, with bits B13 through B8 specifying any one of the address registers 63 . . . 63*n*, and bits B7 through B0 acting as an index field specifying address displacement, the function of which is addressed in more detail below.

The GET BITS instruction identifying the data type as indirect is used to obtain stored bytes of bit map variable data elements from NVM 43. With reference to FIG. 1, when encoder 35 indicates that, for example, printhead 33 is at column Cn (first column where a variable data window is present), the drawing engine 39 fetches the instruction in a corresponding one of the addresses "A" of NVM 43, where a MAKE BITS instruction is set forth so that a bit sequence for fixed data is sequentially stored in column buffer 65. However, since variable windom w1, w2, and w3 have a predetermined position and byte boundary within the indicia 47, the points at which any of the variable windom start and end within a specific column is known. Thus, as a sequential number of bits corresponding, for example, to the number of fixed data bits from the start at the top of column Cn down to the start of window w1 has been loaded to column buffer 65 via a series of instructions, the next instruction (for example address An−1) will be a GET BITS instruction of the indirect data type identifying the address register and an index field so that the drawing engine 39 pointer points to a first address VA0 having a byte of bit map data corresponding to a first byte of variable window data for window w1.

FIG. 5 is an enlarged view of window w1 and shows that, for example, window w1 is made of 3 columns of data (Cn, Cn+1, Cn+2) with each column including 3 bytes of data (bytes 0–8). Drawing engine 39 fetches 3 bytes of window data for a particular column as discussed above and loads that data into column buffer 65 in a sequential bit stream directly after the previously loaded fixed indicia bit stream. When the last byte (byte 2) of variable column data for column Cn is loaded into buffer 65, the pointer returns to address An to continue with the loading of fixed data into the column buffer 65 for the remainder of the fixed data of column Cn located below window w1. When column buffer 65 has a bit stream corresponding to the complete data of column Cn, the bit stream of data from column buffer 65 is loaded into driver buffer 67 for use in energizing the desired printhead elements 33*a* in synchronism with printhead 33 movement as previously discussed to produce the printed column Cn of combined variable and fixed indicia data.

When column Cn has been printed, the printhead 33 moves to the next column Cn+1 and repeats the above identified process. This process is repeated continuously column-by-column until a full indicia image is produced. As previously mentioned, the GET BITS instruction has an index counter so that for each variable element as the printhead 33 moves from column to column, the appropriate byte of bit map data (Bytes 0–8) can be directly accessed. The concept of indexing is well known to those skilled in the art.

As discussed above, the individual fonts for the variable data elements are stored in NVM 43 in bit map form, while the entire fixed indicia image is stored therein in a compressed manner. However, in order to minimize the amount of NVM 43 required to store the fixed indicia image, it is not always efficient to compress the entire fixed indicia image. That is, within any column of the fixed indicia image using a series of one-byte instructions to obtain, for example, a six bit stream of alternating ones and zeros requires much more memory than simply having a single one-byte instruction which provides a bit map of that six bit sequence. The immediate type of GET BITS instruction previously discussed allows for storage of portions of the fixed indicia image in bit map form. Therefore, on a column-by-column basis the fixed indicia image can be stored as a combination of MAKE BITS and GET BITS instructions (as compressed and bit map data) to reduce the amount of NVM 43 required The inventive process and apparatus set forth above has a significant advantage over the prior art in that a temporary RAM in addition to NVM 43 is not required to build more than a single column of the indicia image 47 prior to printing. Rather, all of the fixed and variable data elements are directly downloaded from NVM 43 to a single column buffer for subsequent use in printing a column of the indicia image 47. The fixed and variable data elements are thus combined and printed in real time on a column-by-column basis. Outside of NVM 43, no more than a single column of indicia data is ever built and stored. Moreover, since the windows of the indicia 47 are defined at print run time, the transfer of fixed and variable data elements occurs in real time increasing throughput capability since the extensive editing of all or of a significant part of the indicia image 47 is not required.

Additional advantages and modifications will readily occur to those skilled in the art. Therefore, the invention in its broader aspects is not limited to the specific details, and representative devices, shown and described herein. For example, a plurality of fixed indicia images and advertising slogans can be stored and accessed within the NVM. Additionally, various font sizes can be stored as bit map data to provide flexibility in selecting variable data element sizes. Furthermore, the data included in the indicia image can vary due to individual country postal requirements such that what is considered to be fixed and variable indicia data will also vary from country to country. Accordingly, various modifications may be made without departing from the spirit or scope of the general inventive concept as defined by the appended claims.

What is claimed is:

1. A method for producing an image in a mail handling machine, the method comprising the steps of:

(A) storing fixed and variable image data elements in a non-volatile memory;

(B) selecting from the fixed and variable image data elements stored in the non-volatile memory only specific fixed and variable image data elements required for printing only a single column of the image;

(C) downloading and combining only the selected specific fixed and variable image data elements directly from the non-volatile memory into a buffer;

(D) utilizing the downloaded and combined selected specific fixed and variable image data elements in the buffer for energizing a printing mechanism for printing the first column of the image; and (E) repeating steps B) through D) for printing individually and sequentially subsequent single columns of the image until the image has been printed completely.

2. A method as set forth in claim 1, wherein the step of printing a complete image includes printing a complete postage indicia.

3. A method as set forth in claim 1, further comprising storing fixed and variable data elements in the non-volatile memory in a pre-defined format.

4. A method as set forth in claim 3, wherein the printing mechanism which is energized is a dot matrix printer.

5. A method as set forth in claim 1, wherein a first portion of the fixed image data elements are stored in the non-volatile memory in compressed form and a second portion of the fixed image data elements are stored in the non-volatile memory in bit map form.

6. A method as set forth in claim 5, further comprising storing the variable data elements in the non-volatile memory in bit map form.

7. An apparatus for printing a postage indicia image including:

a printing device;

a non-volatile memory having fixed and variable postage indicia image data elements stored therein, a first portion of the fixed postage indica image data elements being stored in a compressed manner and a second portion of the fixed postage indicia image data elements being stored in a bit-map form;

a first control device for identifying at least one of the variable postage indicia image data elements stored in the non-volatile memory and associated with the postage indicia image;

a second control device for receiving from the first control device data corresponding to the at least one of the variable postage indicia image data elements associated with the postage indicia image and for downloading from the non-volatile memory and combining the fixed postage indicia image data elements associated with the image with the at least one of the variable postage indicia image data elements associated with the postage indicia image and for utilizing the combined fixed and at least one of the variable postage indicia data elements associated with the postage indicia image to cause the printing mechanism to print the image.

8. An apparatus as set forth in claim 7, wherein the second control device includes at least one variable address register, and said first control device loads the variable address register with an address in the non-volatile memory corresponding to the one of the variable postage indicia data elements associated with the postage indicia image.

9. An apparatus as set forth in claim 8, wherein the fixed variable postage indicia image data elements are stored in the non-volatile memory to define a fixed portion of the postage indicia image, said fixed portion of the postage indicia image including a window therein identifying a location where the one of the variable postage indicia image data elements associated with the postage indicia image is placed by the second control device during combining of the fixed postage indicia image data elements associated with the postage indicia image with the one of the variable postage indicia image data elements associated with the postage indicia image.

10. An apparatus as set forth in claim 9, wherein the second control device causes the printing mechanism to print the postage indicia image on a column by column basis.

11. An apparatus as set forth n claim 9, wherein the second control device further includes a buffer and means for directly downloading from the non-volatile memory and combining into the buffer only fixed postage indicia image data elements required for printing a single column of the postage indicia image with a portion of the at least one of the variable postage indicia image data elements required for printing the single column of the postage indicia image, said second control device causing only the single column of the postage indicia image to be printed by the printing device.

12. An apparatus as set forth in claim 11, wherein the second control device is an application specific integrated circuit.

13. An apparatus as set forth in claim 12, wherein the buffer has a memory capacity equal to an amount of data required to print the single column of the postage indicia.

* * * * *